Jan. 20, 1953  E. R. DOAK  2,625,997

HELICOPTER STABILIZING DEVICE

Filed Nov. 1, 1946 3 Sheets-Sheet 1

Inventor
Edmond R. Doak
By Lyon & Lyon
Attorneys

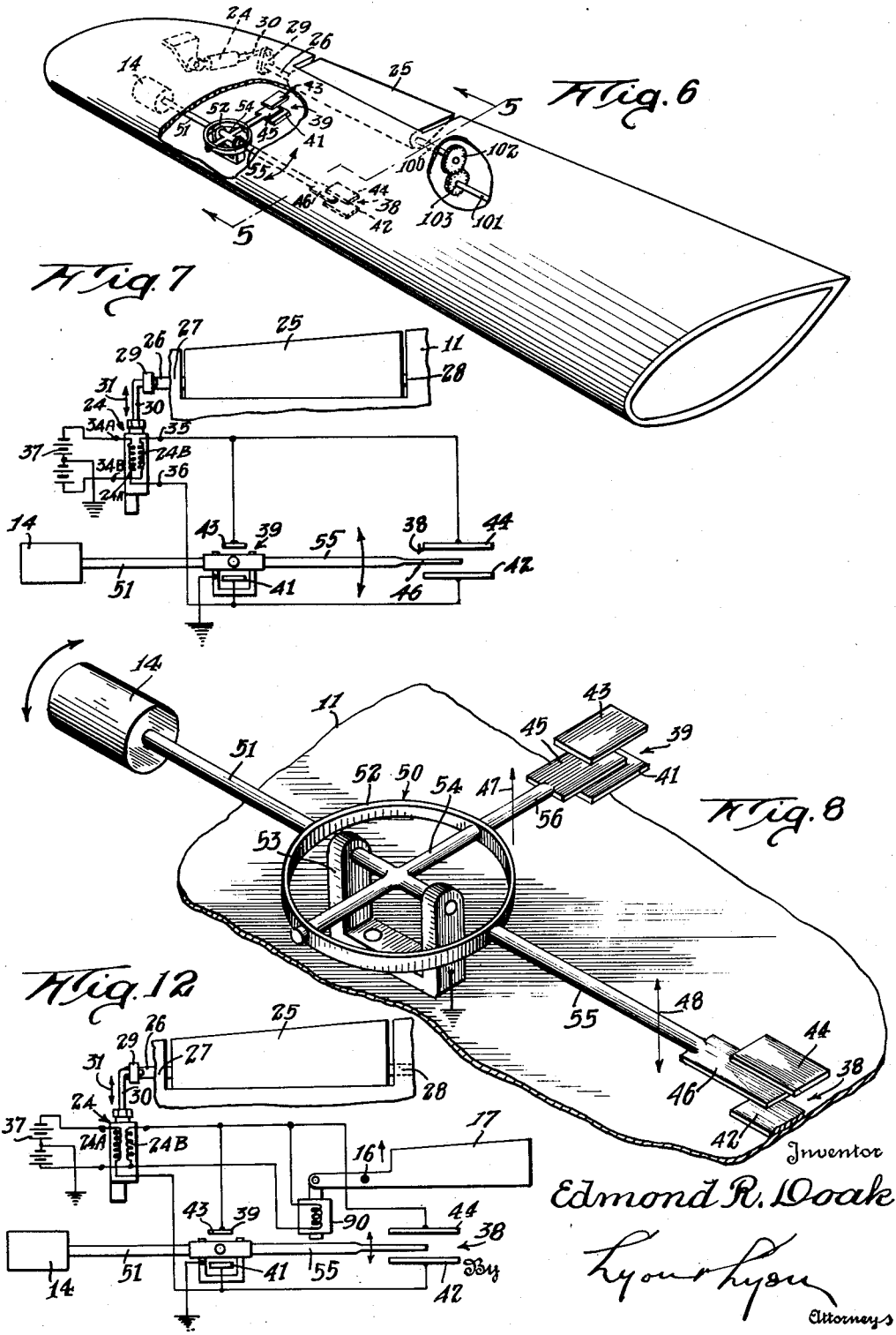

Jan. 20, 1953 E. R. DOAK 2,625,997
HELICOPTER STABILIZING DEVICE
Filed Nov. 1, 1946 3 Sheets-Sheet 3
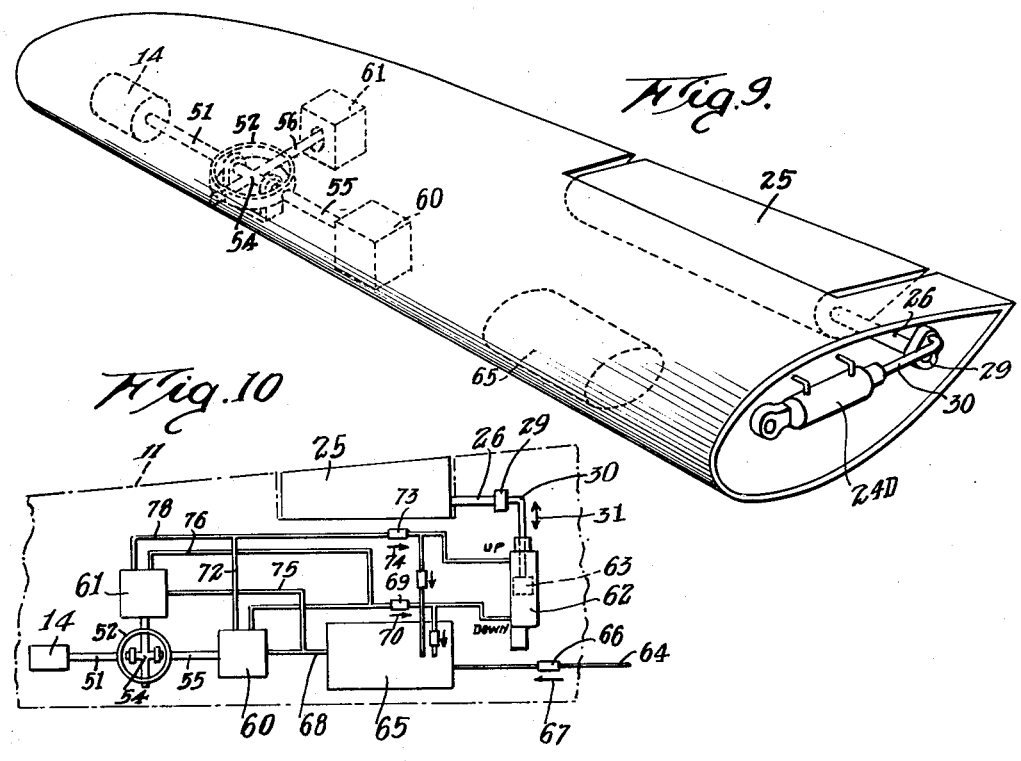
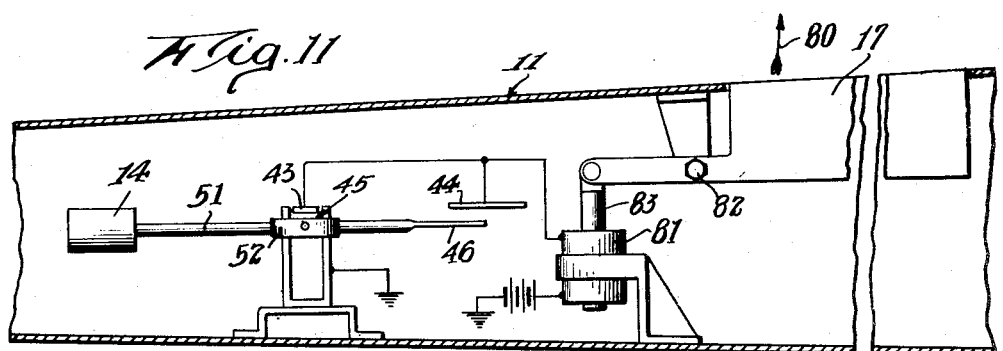
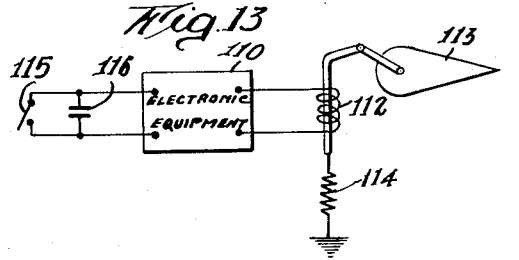
Inventor
Edmond R. Doak
By
Lyon & Lyon
Attorneys

Patented Jan. 20, 1953

2,625,997

UNITED STATES PATENT OFFICE 2,625,997

HELICOPTER STABILIZING DEVICE

Edmond R. Doak, Los Angeles, Calif., assignor to Doak Aircraft Company, Inc., Torrance, Calif., a corporation of California Application November 1, 1946, Serial No. 707,129

11 Claims. (Cl. 170—160.13)

The present invention relates to a method and apparatus for stabilizing lifting rotors useful in helicopters.

Slight and nonuniform disturbances on a helicopter rotor resulting from, for example, a nonuniform air stream, are amplified by the rotating rotor to cause relatively large unbalanced forces to be exerted thereon. Such unbalanced forces, in turn, cause displacement of the rotor from its normal established plane of rotation and, further, such displacement results in a roll and/or pitch of the rotor.

Such roll or pitch is accompanied by translation of the rotor in such a manner and direction that new forces act on the rotor opposing the forces which initially cause the roll and/or pitch; these new forces, however, are equally unstable and cause unbalanced forces on the rotor greater than the original unbalanced forces. Thus, the resulting disturbances and unbalanced forces are cumulative in nature and worsen to the extent that the rotor plane is accelerated from its initial normal plane of rotation into a relative unstable position. As a net result the flight path of the helicopter is translational and undulates through wide angles of pitch and/or roll.

Under such circumstances, if the lifting rotor is constrained for hovering flight, these unstable forces produce a violent wallowing oscillation which rapidly increases in amplitude until an angle is attained where the vertical component of the lift forces vector no longer supports the weight of the helicopter and it falls abruptly.

These facts of unstability are, in the present stage of the helicopter art, corrected before they become catastrophic by the pilot's operation of the rotor pitch controls which require his continuous and undivided attention.

It is, therefore, an object of the present invention to provide a new and improved method and apparatus for stabilizing helicopters characterized by the relief it gives to the pilot.

Another object of the present invention is to provide apparatus automatically operative immediately upon the inception of unbalanced forces on a helicopter rotor for neutralizing such unbalanced forces in a simple, expeditious manner.

Yet another object of the present invention is to provide improved apparatus for stabilizing the flight of a helicopter.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 6 is a perspective view of one of the rotor blades, similar to Figure 2, and shows a modified structure.

Figure 7 is a view, partly structural and partly diagrammatic, showing the electrical interconnection of the elements shown in Figure 6.

Figure 8 is an enlarged view of some of the apparatus shown in Figure 6.

Figure 9 is a perspective view of one of the rotor blades similar to Figure 2 and shows another modified structure embodying the present invention.

Figure 10 is a view, partly in structural and partly in diagrammatic form, showing the manner in which elements shown in Figure 9 are interconnected.

Figure 11 is an enlarged view of another modified structure incorporating the present invention.

Figures 12 and 13 show other modifications of the apparatus embodying the present invention.

In accordance with certain aspects of the present invention, the helicopter rotor stabilizer includes a small centrifugally operated weight, preferably within the confines of the rotor and hinged universally with the hinged axes parallel to the rotor plane so that centrifugal forces will maintain the weight in or nearly parallel to the plane of rotation from where it nods and/or precesses in a direction normal to the direction of the centrifugal forces when and as the rotor changes its plane of rotation. Such nodding and/or precessing of the weight causes operation of an aerodynamic element such as a spoiler and/or flap in such a manner as to increase or decrease, as the case may be, the blade lift in the azimuth where the lift is unbalanced and is causing the rotor to change its plane of rotation.

Movement of the centrifugally operated weight may be imparted to the aerodynamic elements such as a spoiler or flap by a simple mechanical linkage or a servo-unit of the electric hydraulic or pneumatic type controlled in accordance with movement of the weight.

Figure 1:
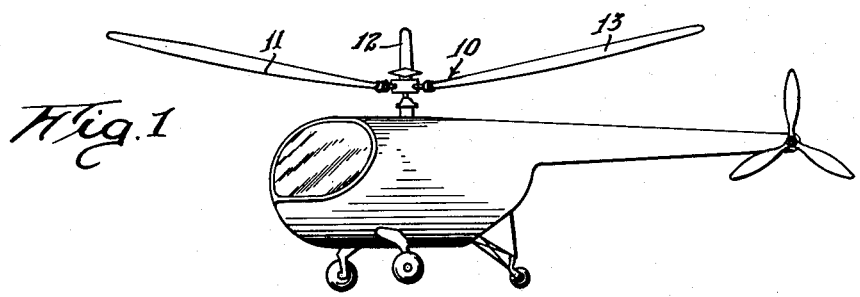
Figure 1 shows a helicopter in which the method and apparatus of the instant invention is present.

In Figure 1 the helicopter is of conventional construction and has a rotor 10 with three blades 11, 12 and 13, which are also of conventional structure and adjustment and are driven in conventional manner. However, each one of the blades has individual lift control means associated therewith in accordance with the present invention. Such lift control means may be an air spoiler or a trailing edge flap operated by a simple mechanical lifter or electrical, pneumatic or hydraulic servo-mechanism which in turn is operated upon movement of a centrifugally operated member or gyroscopic control member in accordance with the many modifications of the present invention shown and described herein. These different stabilizing devices are shown in the drawings as associated with the rotor blade 11, but it is understood of course that an identical stabilizer mechanism is present on each one of the other two blades 12 and 13.

Figure 2:
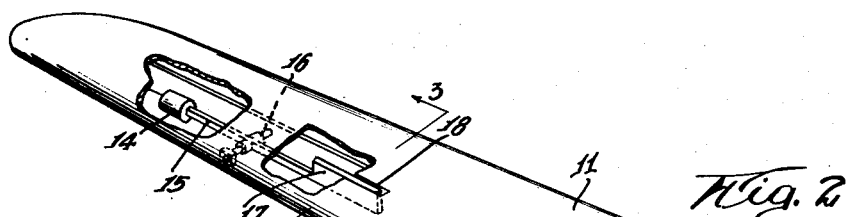
Figure 2 is a view in perspective of one of the rotor blades, partly broken away, shown in Figure 1.
Figure 3:
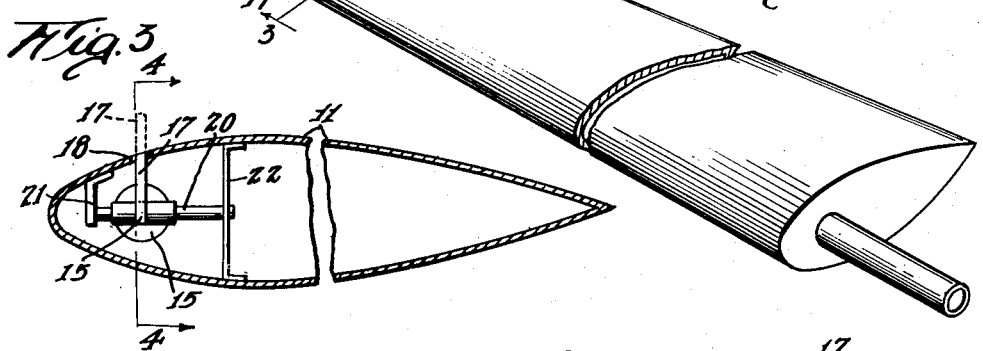
Figure 3 is a sectional view taken substantially on the line 3—3 of Figure 2.
Figure 4:
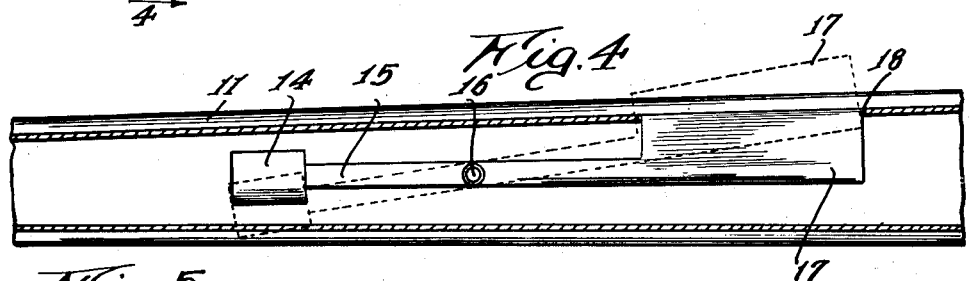
Figure 4 is a sectional view taken substantially on the line 4—4 of Figure 3.

In the particular arrangement shown specifically in Figures 2 to 4, a centrifugally operated weight 14 is affixed on one end of a lever 15, which is pivoted at a point 16 intermediate its end with the other end of the lever 15 formed as an air spoiler 17, normally confined within the confines of the blade 11, but arranged to pass through a slotted opening 18 in the upper surface of the blade 11 (as shown in dotted lines in Figures 3 and 4) upon movement of the weight 14 from its normal position. When the blade 11 is rotated in its normal plane of rotation acting on resultant unbalanced forces on the rotor 10, the weight 14 is urged under centrifugal forces acting thereon to its normal position shown in full lines in Figures 3 and 4 wherein a plane longitudinally through the center of blade 11 passes through the geometrical center of the weight 14.

In the event there is an unbalanced force present on the rotor 10, the rotor as a whole is moved bodily to a skewed position wherein each one of the blades as it rotates is moved upwardly; but when and as a blade moves upwardly the centrifugal force on the weight 14 tends to maintain it in its original position with a result that the air spoiler 17 remains relatively stationary and the blade 11 moves relative thereto so as to cause exposure of the spoiler 17 and consequent spoiling of the air stream on the upper surface of the blade 11. This air spoiling, of course, results in loss of lift in that particular blade and, accordingly, it drops down in a direction approaching the normal position it otherwise occupies when no unbalanced forces are present on the rotor. In its dropping movement the blade 11 gradually, in a continuous step, confines more and more the air spoiler 17 to produce less and less air spoiling whereby the blade 11 gradually returns to its normal position (corresponding to no unbalanced forces on the rotor).

It is apparent that many different means may be used for pivotally mounting the weight 14 and air spoiler 17 within the confines of the blade 11. In this particular instance the lever 15 is journaled on a shaft 20 having its opposite ends anchored respectively in suitable bracket members 21 and 22.

Figure 5:
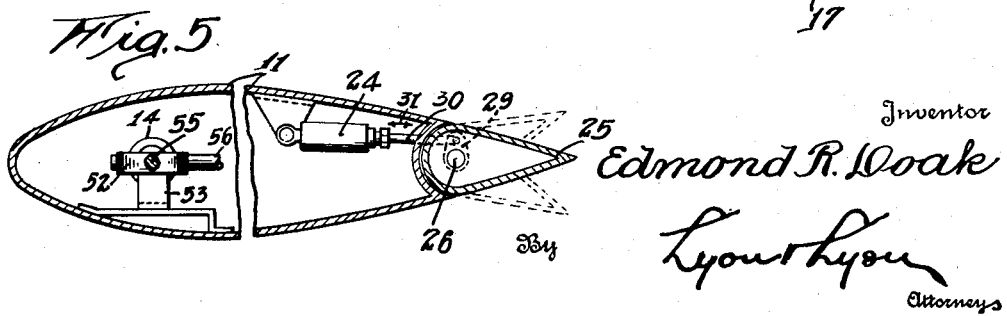
Figure 5 is a sectional view taken substantially on the line 5—5 of Figure 6 in which a modified structure is shown.

In the modified arrangement shown in Figures 5-8 the lift of the blade 11 is controlled by positioning a trailing edge flap 25, which is pivotally mounted on a shaft 26 and is movable by means of an electrical servo-mechanism 24 from its normal position shown in full lines in Figure 5 to either one of its two extreme positions shown in dotted lines. The shaft 26 is suitably journaled at the spaced points 27 and 28 (Figure 7) in the blade 11 with a crank arm 29 affixed to shaft 26 and extending therefrom for engagement with and movement by the longitudinally movable rod 30 extending from the free end of the crank arm 29 into the servo-mechanism 24 for actuation thereby. The servo-mechanism 24 is arranged to move the actuated rod 30 in two directions as indicated by the arrows 31 in Figures 5 and 7 upon selective energization of the solenoid coils 24A and 24B. The electrical servo-mechanism 24 is arranged to move the flap 25 down from its normal position when the blade 11 is skewed upwardly in response to unbalanced forces on the rotor proper; and, conversely, the servo-mechanism 24 moves the flap 25 upwardly from its normal position when the blade 11 is skewed downwardly in response to unbalanced forces acting on the rotor proper. Hence, during one complete revolution of one of the blades 11, 12 or 13, as the case may be, while the rotor proper is skewed because of unbalanced forces acting thereon, the flap 25 is caused to make one oscillation about its normal full line position shown in Figure 5.

The servo-mechanism 24 has four terminals, the input terminals 34A and 34B and the output terminals 35 and 36. When the terminal 35 is grounded a current flows from the positive terminal of the voltage source 37 which has its center tap grounded. When the terminal 36 of coil 24A is grounded, current flows through the coil 24A from the negative terminal of the voltage source 37. The terminals 35 and 36 are grounded through one of the pair of switches 38 and 39. The switches 38 and 39 comprise respectively a pair of fixed contact members 42, 44 and 41, 43 stationarily mounted with respect to the blade 11 and a corresponding movable contact 46 and 45, each of which is arranged to move respectively in the direction indicated by the arrows 48 and 47 in response to movement of the weight 14. The weight 14, due to the action of centrifugal forces acting thereon, imparts movement to the movable switch contact elements 46 and 45 in the directions 48 and 47 respectively through the universal connection 50.

The weight 14 is mounted for universal movement on the rotor blade 11, the rod 51 extending axially from the cylindrical weight 14, to which it is affixed, being fastened to the ring member 52 which is pivotally mounted on the U-shaped bracket 53 on the blade 11 by means of the cross shaped member 54. Since a gyroscope is defined as a rotating wheel universally mounted, the weight 14 since it is mounted for universal movement on the rotor blade 11 has the same forces applied thereto as a gyroscope. In this connection precession of the weight 14 may be defined as follows: when the weight 14 is subjected to a force which tends to alter the direction of the axis about which it rotates in space, the force meets with great resistance, and the weight 14 will turn about an axis at right angles to the axis about which the force was applied, the movement being such as to place the plane and direction of spinning rotation of the weight coincident with the plane and direction of the force by the shortest path. One of the axes of the cross shaped member 54 is axially aligned with the cylindrical rod member 51 on the one hand and with the cylindrical switch arm 55 on the other hand, while the other axis of the cross shaped member 54 is in quadrature with the axis of the member 51 and extends coaxially with the switch actuating rod 56.

It is apparent that the switch 38 may be considered to be actuated in response to nodding of the weight 14 while the switch 39 is actuated in response to precessing of the weight 14, the structure described being responsive to gyroscopic forces. When the weight 14, which normally travels in a horizontal plane, is subjected to a force which tends to alter the direction of its rotational axis in space, the force meets with great resistance and the ring shaped member 52 will turn about an axis at right angles to the axis about which the force was applied, the movement being such as to place the plane of spinning rotation of the weight 14 coincident with the plane and direction of the forces by the shortest path.

When the weight 14 causes the grounded contact member 46 to engage contact 44, which in turn is connected to terminal 35, the flap 25 moves downwardly thereby to cause the blade 11 to move downwardly; conversely, when the grounded contact member 46 abuts the contact 42, which is connected to terminal 36, the flap 25 moves upwardly thereby to cause the blade 11 to be deflected upwardly.

In response to precesing movement of the weight 14, the contact 45 engages either contact 43 or 41, as the case may be, depending upon the direction of the unbalanced force acting upon the rotor proper. When the contact 45 abuts contact 43 the terminal 35 is grounded to thereby cause the flap 25 to move downwardly to cause movement of the blade 11 downwardly; conversely, when the grounded contact member 45 engages the contact 41, the terminal 36 is grounded to thereby cause the flap 25 to move upwardly to cause upward movement of the blade 11.

While the servo-mechanism 24 shown and described in connection with the modification shown in Figures 5-8, inclusive, is of the electrical solenoid type, the servo-mechanism as shown in the modification in Figures 9 and 10 may be of the fluid type wherein the fluid may be noncompressible as in the case of a hydraulic control, or may be of the compressible type such as is the case in a pneumatic control. It is understood therefore that the description of Figures 9 and 10 relate equally well to both the pneumatic and hydraulic types of control.

The flap and gyroscopic control in Figures 5 through 9 are identical and have identical reference numerals. In the modification shown in Figure 10, however, the weight 14 causes operation of a conventional type of valves 60 and 61, respectively, in response to nodding and precessing movement of the weight 14. These valves control the flow of fluid to the fluid servo-mechanism 62 having a fluid piston 63 arranged to move the rod 30 in directions indicated by the arrow 31 in Figure 10. Fluid for moving the piston 63 is obtained from a fluid supply line 64 which supplies fluid to the fluid reservoir 65 through a check valve 66 arranged to pass fluid only in the direction of the arrow 67. Fluid is transferred to the servo-mechanism 62 from the reservoir 65 through one of the four following paths: (1) From reservoir 65 through piping 68, through valve 60, through check valve 69 arranged to pass fluid only in the direction indicated by the arrow 70, into the downward end of the servo-mechanism 62; (2) From the reservoir 65 through the piping 68, through the valve 60, through the piping 72, through the check valve 73 arranged to pass fluid only in the direction indicated by the arrow 74, into the upper end of the servo-mechanism 62; (3) From the reservoir 65 through piping 75, valve 61, through piping 76, through check valve 69 into the bottom end of the servo-mechanism 62; and (4) From the reservoir 65 through the piping 75, through the valve 61, through the piping 78, through the check valve 73 into the upper end of the servo-mechanism 62.

It is noted that the valves 60 and 61 each comprise two valves, one of which is actuated at the extreme ends of movement of the arms 55 and 56 in an analogous manner in which the arms 55 and 56 effect operation of the switches 38 and 39 in Figure 8. Corresponding movements of the weight 14 in the two modifications shown in Figures 5-10 produce corresponding movements of the flap 25.

In the modification shown in Figure 11, the air spoiler 17 is moved upwardly in the direction of the arrow 80 in accordance with nodding and precessing movement of the weight 14. The spoiler 17 is arranged to be moved upwardly out of its confined position within the blade 11 upon energization of the solenoid coil 81, the spoiler 17 being formed on one end of the pivoted member 82 with its free end pivotally mounted on the movable armature 83. The solenoid coil 81 has one of its terminals grounded and its other terminal connected to the contact members 43 and 44, which form switch elements with grounded contact elements 46 and 45 in precisely the same manner as do the identical numbered contacts described in connection with Figure 8. As a matter of fact, the switching structure shown in Figures 8 and 11 are identical but for the fact that the contacts 41 and 42 shown in the modification in Figure 8 are not necessary in the modification shown in Figure 11. Upon nodding and/or precessing of the weight 14, contacts 44 and 46 and/or contacts 43 and 45 engage as the case may be to cause current to flow through the coil 81 to thereby cause movement of the spoiler 17 into its air spoiling position.

In the modification shown in Figure 12, the trailing edge flap 25 and air spoiler 17 are operated simultaneously upon nodding and/or precessing of the weight 14 and combines the features of the apparatus shown in the modifications in Figures 7 and 11. In Figure 12 the apparatus is identical to that described in connection with Figure 7 and identical parts have identical reference numerals. However, in addition, the apparatus in Figure 12 includes an air spoiler 17 arranged to be moved into air spoiling position upon energization of the solenoid coil 90, which is connected in shunt or parallel to the coil 24B. Thus, whenever the coil 24B is energized to cause the blade 11 to move downwardly, the spoiler 17 is simultaneously moved to air spoiling position thereby to cause a similar lift force to be exerted on the blade 11 so that the operation of the flap 25 and spoiler 17 produces a similar lowering effect on the blade 11.

Although I have shown herein the use of both flaps and air spoilers for achieving certain features of this invention, it is understood that I prefer to use the flap structure and in such case, I prefer to place the movable flap as close to the tip of the blade as possible. The flap arrangement is preferred inasmuch as it appears that the flap may be moved quickly and produces desirable results without lag.

It is understood that it is within the scope of the present invention to provide mechanical linkage between oppositely acting flaps or air spoilers arranged to assure synchronized movement of such oppositely acting flaps or spoilers in equal amounts and in opposite directions. Such linkage is shown in Figure 6 wherein the rotatable shaft 100 rotatable with the flap 25 is geared to the shaft 101 through a pair of gears 102 and 103 having a one to one ratio. The shaft 101 is linked to the flap on the second one of a two-bladed arrangement to assure equal and opposite movements of the respective flaps on the two blades. Further, it is apparent that springs either of the compression or tension types may be used to bias the flaps or air spoilers in a predetermined normal position.

It is further evident that the position of the air spoilers or flaps may be made responsive either to the closing of an electrical circuit or to the opening of the electrical circuit. In view of the relatively high speed of rotation of the rotating blades, it is desirable to actuate the flaps or air spoilers as rapidly as possible upon the occurrence of a disturbance. For this reason, it is preferred to cause actuation of such flaps or spoilers by deenergizing an electrical circuit instead of energizing a circuit. For this reason, it is desirable to use electronic equipment associated with a circuit having energy storing properties and arranged so that the flap or spoiler is maintained in normal position when the full amount of energy is stored within such circuit and arranged to cause movement of such flaps or spoilers upon a change in energy in such circuit. This change in energy may be produced by either opening or closing a switch. For example, the electronic apparatus having the general reference numeral 110 normally energizes the magnet 112 to thereby maintain the flap 113 in its normal position against the action of the tension spring 114. Upon closing of the switch 115, which may be actuated in any of the manners previously described, the normally charged condenser 116 is discharged to thereby effect a control on the equipment 110 such that the magnet coil 112 becomes deenergized whereupon the tension spring 114 causes the flap 113 to move to an effective position for producing stabilization of the type previously described. The apparatus described in connection with Figure 13 is arranged to cause counterclockwise movement of the flap 113. Apparatus essentially the same as that shown in Figure 13 is associated with the flap 113 to cause clockwise movement of the flap 113 in the event that such correction is called for by the actuation of a switch of the same type as switch 115.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a helicopter stabilizing arrangement for stabilizing the flight of a helicopter, in combination with the lifting rotor blade of the helicopter which is subject to pitching and rolling forces while said blade is rotating about its rotational axis, a weighted member, and means mounting said weighted member for movement on said blade and normally maintaining said weighted member relatively stationary with respect to said blade regardless of the speed of rotation of said blade so long as said blade continues to rotate in a predetermined plane, a lift control element effective to alter the flow of air past said blade to alter the aerodynamic lift forces developed on said blade, means mounting said lift control element on said blade for relative movement between said lift control element and said blade, and means interconnecting said weighted member to said lift control element, said interconnecting means incorporating means whereby said weighted member is effective to change the position of said lift control element relative to said blade when and as said rotational axis of said blade is abruptly changed in response to such pitching and rolling forces to change the lift forces developed on said blade.

2. The invention set forth in claim 1 characterized in that the lift control element is an air spoiler effective to produce turbulence in the air flow past said blade to thereby spoil such air flow.

3. The invention set forth in claim 1 characterized in that the lift control element is a trailing edge flap.

4. The invention set forth in claim 1 characterized in that the lift control element is both an air spoiler and a trailing edge flap, said air spoiler being effective to produce turbulence in the flow of air past said blade to thereby spoil said air flow.

5. The invention set forth in claim 1 characterized in that the interconnecting means comprises a rigid extension of the weighted member.

6. The invention set forth in claim 1 characterized in that the interconnecting means comprises a joined mechanical linkage operated by the weighted member.

7. The invention set forth in claim 1 characterized in that the interconnecting means comprises an electrically operated servo-unit controlled by the weighted member.

8. The invention set forth in claim 1 characterized in that the interconnecting means comprises a pneumatically operated servo-unit controlled by the weighted member.

9. In a helicopter stabilizing arrangement for stabilizing the flight of a helicopter, in combination with the lifting rotor blade of the helicopter which is subject to pitching and rolling forces while said blade is rotating about its rotational axis, a centrifugally operated weight movably mounted on and within the confines of the rotor blade and normally maintained relatively stationary with respect to said blade regardless of the speed of rotation of said blade so long as said blade continues to rotate in a predetermined plane, means pivotally mounting said weight on said blade for movement about an axis extending substantially parallel to said predetermined plane, a lift control element effective to alter the flow of air past said blade to alter the aerodynamic lift forces developed on said blade, means mounting said lift control element on said blade for relative movement between said element and said blade, means interconnecting said weight to said lift control element, said interconnecting means incorporating means whereby said weight is effective to change its position relative to said blade when and as the plane of rotation of said blade is abruptly changed in response to such pitching and rolling forces to change the position of said lift control element to thereby change the lift forces developed on said blade.

10. In a helicopter stabilizing arrangement for stabilizing the flight of a helicopter, in combination with a lifting rotor blade of the helicopter which is subject to pitching and rolling forces, a lift control element effective to alter the flow of air past said blade to alter the aerodynamic lift forces developed on said blade, means mounting said lift control element on said blade for relative movement between said element and said blade, a centrifugally operated weight means movably mounting said weight on said blade for movement between said blade and said weight, and normally maintaining said weight in a fixed position relative to the blade regardless of the speed of rotation of said blade so long as said blade continues to rotate in a predetermined plane, said mounting means including means pivotally mounting said weight about an axis which extends substantially parallel to said predetermined plane whereby said weight may nod when and as the plane of rotation of said blade is abruptly changed, means pivotally mounting said weight about an axis which extends in the longitudinal direction of said blade whereby said weight may precess when and as the plane of rotation of said blade is abruptly changed, and means interconnecting said weight to said lift control element to change the position of said lift control element upon movement of said weight.

11. In a helicopter stabilizing arrangement for stabilizing the flight of a helicopter, in combination with a lifting rotor blade of the helicopter which is subject to pitching and rolling forces, a weighted member normally maintained stationary with respect to said blade regardless of the speed of rotation of said blade so long as said blade continues to rotate in a predetermined plane, means movably mounting said weighted member on said blade for both pivotal movement of said weighted member about an axis which extends substantially parallel to said predetermined plane, and also for pivotal movement about an axis which extends generally longitudinally of said blade whereby said weighted member may move when and as the plane of rotation of said blade is abruptly changed in response to such pitching and rolling forces, a lift control element effective to alter the flow of air past said blade to alter the aerodynamic lift forces developed on said blade, said lift control element being effective to alter said flow of air in accordance with the position of said lift control element, and means connected between said weighted member and said lift control element to change the position of said lift control element in accordance with movement of said weighted member.

EDMOND R. DOAK.

REFERENCES CITED

The following references are of record in the file of this patent:

UNITED STATES PATENTS

| Number | Name | Date |
|---|---|---|
| 1,334,707 | Martin | Mar. 23, 1920 |
| 1,464,784 | Tarbox | Aug. 14, 1923 |
| 1,537,401 | Blumshein | May 12, 1925 |
| 1,884,847 | Pitcairn | Oct. 25, 1932 |
| 2,058,500 | Plucker | Oct. 27, 1936 |
| 2,076,520 | Swanson | Apr. 6, 1937 |
| 2,148,921 | Allen | Feb. 28, 1939 |
| 2,222,886 | Voigt | Nov. 26, 1940 |
| 2,369,049 | Hays | Feb. 6, 1945 |
| 2,385,028 | Reid | Sept. 18, 1945 |
| 2,429,665 | Biermann | Oct. 28, 1947 |
| 2,456,485 | Bendix | Dec. 14, 1948 |